Patented Jan. 23, 1934

1,944,158

UNITED STATES PATENT OFFICE 1,944,158

METHOD FOR PRODUCING ZINC OXIDE

Richard W. French, Bristol, Pa., assignor to Superior Zinc Corporation, Philadelphia, Pa., a corporation of Pennsylvania No Drawing. Application December 23, 1930
Serial No. 504,421

5 Claims. (Cl. 23—147)

My invention relates to a method for producing improved zinc oxide from by-product zinc residues.

The object of my invention is to provide a method whereby improved zinc oxide, that is to say of a grade adaptable for use as a pigment in paints, in connection with the manufacture of linoleum, pottery, rubber, insecticides, etc., may be produced from by-product zinc residues, such as from chemical plants.

By-product zinc residues of, for example, chemical plants from which, by virtue of my invention, I recover a high grade zinc oxide, contain, as is well known, metallic zinc, zinc carbonate, zinc sulphite, and alkali metal salts, as sodium carbonate, sodium sulphite, potassium salts, etc. Heretofore various attempts have been made to produce zinc oxide from such by-product zinc residues, but there has only been obtained zinc oxide of low grade and in no sense adaptable for use as a pigment or in the manufacture of linoleum, pottery, etc.

Heretofore in the production of zinc oxide from by-product residues, it has been customary to first dry and calcine the residue in order to render the alkali metal salt content soluble and which also oxidized the metallic zinc, then to separate the zinc oxide from the alkali metal salt content by washing. The zinc oxide so produced is of low grade and has heretofore been adaptable for use only for purposes such as in the manufacture of zinc chloride, lithopone, etc. The zinc oxide product is undesirable for use as a pigment primarily because of bad texture and low strength or hiding power.

Now, in accordance with my invention, I provide a method whereby the metallic zinc content of the residue is oxidized and the alkali metal salts rendered soluble and separated from the zinc oxide, carbonate and sulphite before calcining, the separated zinc oxide, carbonate and sulphite being then calcined sufficiently to convert the carbonate to oxide and to oxidize the sulphite to sulphate in the presence of air. Incidentally, the calcining at this stage develops strength in the zinc oxide. The zinc sulphate is then separated by washing out with water and the oxide ground to improve its texture, then finally washed and dried.

In carrying the method in accordance with my invention into practice, for example, a quantity of by-product zinc residue containing, for example, metallic zinc, zinc carbonate, zinc sulphite and alkali metal salts as sodium carbonate, and sodium sulphite, etc., is suspended in water forming a pulp and aerated to largely oxidize the metallic zinc content. The aeration may be accomplished by blowing air through the pulp, oxidation of the metallic zinc being noted by the fact that normally of a blue black color it turns white on oxidation.

When the metallic zinc content has been oxidized the suspended residue is heated to boiling and boiled for a period to render the alkali metal salts, as sodium carbonate, sodium sulphite, etc. soluble in water. Boiling may be continued for say up to thirty minutes or longer, if necessary.

Water is then drawn off from the residue and the residue washed with fresh water until free from alkali metal salts. On completion of the washing the residue will comprise largely zinc oxide, carbonate and sulphite and this residue is then calcined in the presence of excess air to effect conversion of the carbonate into oxide and to effect oxidation of the sulphite to sulphate or its decomposition into oxide. The calcining may be effected in any suitable manner and for effecting the purpose a temperature of about 400° C.–1,000° C. may be used, the calcining being continued for such time as is necessary to effect the conversion of the carbonate to oxide and conversion of the sulphite to sulphate or oxide under the conditions pertaining.

On completion of the calcining the residue is ground and then washed with water to remove the zinc sulphate and then dried. The grinding of the zinc oxide may be effected, for example, in a pebble mill or a colloid mill. The grinding will improve the texture of the product.

The zinc oxide, product of the method in accordance with my invention, will be found to be of high grade. It will be of desirable strength and texture, adapting it for use, for example, as a pigment and in the manufacture of linoleum, pottery, etc., for which zinc oxide produced from by-products has not heretofore been adaptable due principally to bad texture and low strength.

It will be understood that the process embodying my invention, as described above, is susceptible of wide variation without departing from my invention, it being noted that in accordance with my invention essentially the alkali metal salt content of the residue is removed, for example, by treating the residue to render the alkali metal salt content soluble, before the residue; i. e., the zinc content, is calcined.

What I claim and desire to protect by Letters Patent is:

1. The method of producing zinc oxide from by-product zinc residue comprising metallic zinc, zinc carbonate, zinc sulphite, and an alkali metal salt, which includes suspending the residue in water, aerating to effect oxidation of metallic zinc, boiling the aqueous mixture to render alkali metal salt soluble, removing the alkali metal salt in solution, calcining the residue to convert the zinc carbonate into zinc oxide and to oxidize zinc sulphite to zinc sulphate, washing out the zinc sulphate and grinding the zinc oxide.

2. The method of producing zinc oxide from by-product zinc residues containing an alkali metal salt and a substantial amount of zinc carbonate, which includes boiling the residues with water to render the alkali metal salt content soluble, washing to dissolve and practically completely remove the alkali metal salt content, and then calcining the residue.

3. The method of producing zinc oxide from by-product zinc residues containing an alkali metal salt, a substantial amount of zinc carbonate, and combined sulphur, which includes oxidizing metallic zinc contained in the residue to zinc oxide, heating the residue in the presence of water to render the alkali metal salt soluble, removing the alkali metal salt in solution, calcining the residue under oxidizing conditions which will convert zinc carbonate and any sulphur compound present largely into zinc sulphate, zinc oxide, and sulphur dioxide, and removing the sulphate.

4. The method of producing zinc oxide from by-product zinc residues containing an alkali metal salt, a substantial amount of zinc carbonate, and combined sulphur, which includes oxidizing metallic zinc to zinc oxide by aeration of the residue in the form of a pulp, heating the residue in the presence of water to render the alkali metal salt soluble, removing the alkali metal salt in solution, calcining the residue under oxidizing conditions which will convert zinc carbonate and any sulphur compound present largely into zinc sulphate, zinc oxide, and sulphur dioxide, removing the sulphate by washing, and grinding the zinc oxide produced.

5. The method of producing zinc oxide from by-product zinc residues containing an alkali metal salt, a substantial amount of zinc carbonate, and combined sulphur, which includes heating the residue in the presence of water to render the alkali metal salt soluble, removing the alkali metal salt in solution, calcining the residue under oxidizing conditions which will convert zinc carbonate and any sulphur compound present largely into zinc sulphate, zinc oxide, and sulphur dioxide, removing the sulphate by washing, and grinding the zinc oxide produced.

RICHARD W. FRENCH.